United States Patent
Modzelewski et al.

(10) Patent No.: US 9,432,238 B2
(45) Date of Patent: Aug. 30, 2016

(54) COMMUNICATING LARGE AMOUNTS OF DATA OVER A NETWORK WITH IMPROVED EFFICIENCY

(71) Applicant: Dropbox, Inc., San Francisco, CA (US)

(72) Inventors: Kevin Modzelewski, San Francisco, CA (US); Akhil Gupta, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 664 days.

(21) Appl. No.: 13/723,168

(22) Filed: Dec. 20, 2012

(65) Prior Publication Data

US 2014/0181258 A1 Jun. 26, 2014

(51) Int. Cl.
  *G06F 15/16* (2006.01)
  *H04L 29/06* (2006.01)
  *H04L 29/08* (2006.01)

(52) U.S. Cl.
  CPC ............. *H04L 29/06* (2013.01); *H04L 67/06* (2013.01); *H04L 67/1097* (2013.01)

(58) Field of Classification Search
  CPC ..... H04L 67/306; H04L 29/06; H04L 67/06; H04L 67/1097; H04L 69/24; H04L 67/322
  See application file for complete search history.

(56) References Cited

U.S. PATENT DOCUMENTS

| | | | |
|---|---|---|---|
| 2003/0004947 A1* | 1/2003 | Coverston | 707/9 |
| 2004/0122909 A1* | 6/2004 | Saika | H04L 67/06 709/213 |
| 2007/0180115 A1* | 8/2007 | Bahrs et al. | 709/226 |
| 2009/0088183 A1* | 4/2009 | Piersol et al. | 455/456.1 |
| 2010/0070628 A1* | 3/2010 | Harrang et al. | 709/224 |
| 2013/0311612 A1* | 11/2013 | Dickinson | 709/219 |

* cited by examiner

*Primary Examiner* — Cheikh Ndiaye
(74) *Attorney, Agent, or Firm* — Polsinelli PC

(57) ABSTRACT

Disclosed herein are systems, methods, and computer-readable storage media for communicating large amounts of data. A system can first receive a request for data and determines if the data requested is above a threshold size. If the data is above the threshold size, the system can then prepare a message containing header information following a standard file transfer protocol. The system can also prepare metadata indicating a storage location and a size of the data requested. The message and the metadata can then be separately communicated to the requester. Upon receiving the metadata, a data stream can initiate the transfer of the data from the storage location to the requester, where the data stream removes unnecessary or redundant header information during the transfer from the storage location.

17 Claims, 5 Drawing Sheets

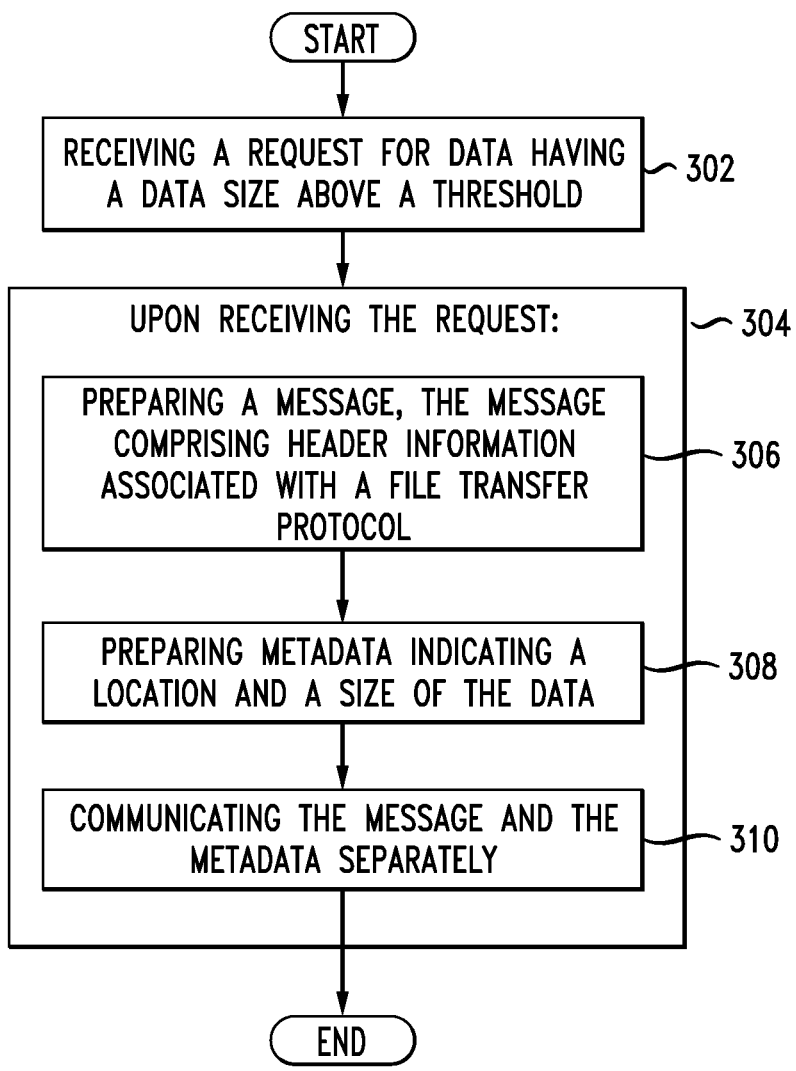

COMMUNICATING LARGE AMOUNTS OF DATA OVER A NETWORK WITH IMPROVED EFFICIENCY

TECHNICAL FIELD

The present disclosure relates to communications of large amounts of data over a network and more specifically to a protocol that improves the efficiency of the communications when the data is above a threshold value.

BACKGROUND

When storing data, it is often desirable to have the data stored in multiple locations. Multiple storage locations ensure accessibility should one or more of the locations become unavailable, and can, in some cases, provide for increased customization in how the data is stored and/or retrieved. However, storing the data at multiple locations, whether those locations are physically distinct or are co-located partitions of a single data storage device, often leads to delays in both storage and recovery of data. These delays often originate in the duplication of instructions and/or data for each location. While for relatively small data sizes these duplication delays may be negligible to a given user, as the size of the data increases any duplication delay in storing or retrieving data can result in delays that can be detected by the user.

With cloud computing and network based storage services, these delays can impact customer perceptions of the service. A network based storage service allows users to store, access, and manipulate data on databases and servers maintained across a network, thereby freeing users from being concerned with where the data will be physically stored while giving users near instantaneous access to the data from virtually any network access point. However, users using network based storage services generally want access to their data to be near instantaneous, not delayed or slow. When customers begin to experience substantial delays in storing and retrieving data, customer confidence and satisfaction wanes.

Standard data transfer protocols utilize communication layers and levels, such as the physical level, the frame level, and the packet level, to indicate where each piece of data is sent. Each layer results in increased information being added to the transmitted packets as headers, indicating where the data is being transmitted to, and depending on the protocol, where the data is being transmitted from. These headers are then "unwrapped" and interpreted one layer at a time for each and every frame of the data being communicated until the data arrives at its destination, at which point a response or an acknowledgment signal can be sent. When considering the overall use of network bandwidth, the header information associated with each layer can result in significant bandwidth consumption, and ultimately result in extra costs, delays, or communication time.

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out hereinafter. These and other features of the disclosure will become more fully apparent from the following description and accompanying drawings, or can be learned by the practice of the principles set forth herein.

Disclosed are systems, methods, and non-transitory computer-readable storage media for communicating large amounts of data. A system practicing the method disclosed herein can first receive a request for data and determines if the data requested is above a threshold size. If the data is above the threshold size, the system can then prepare a message containing header information following a standard file transfer protocol. The system can also prepare metadata indicating a storage location and a size of the data requested. The message and the metadata can then be separately communicated to the requester. Upon receiving the metadata, a data stream can initiate the transfer of the data from the storage location to the requester, where the data stream can remove unnecessary or redundant header information during the transfer from the storage location.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 shows an example method embodiment;

DETAILED DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

A system, method and computer-readable media are disclosed which can communicate large amounts of data over a network with increased efficiency. A system practicing the method disclosed herein can first receive a request for data and determine if the data requested is above a threshold size. The requester can be an entity such as a human being operating a user device, such as a terminal, smartphone, computer, or other form of computing device, or the requester can be a database or server operating according to specified instructions. The request for data may often, although not always, be associated with a specific file. For example, the requester can send a request for the file "ABC.doc." The system, upon receiving the request, can attempt to locate the data within a data storage space. This data storage space can be an online data storage space, a specific database or server, or can be a specific hard drive or hard drive partition. In various embodiments, the data storage space can be part of a remote shared content item storage system. The system can then consider the overall size of the data requested. When the size of the data requested is below a threshold, the system can, in certain configurations, determine that the data should be transferred using standard file transfer protocols.

When the data is above the threshold size, the system can prepare a message containing header information following a standard file transfer protocol. The size of the data, as well as the format of the data, can also be included in the message. However, rather than including the data within the message, the system can instead prepare metadata indicating the storage location of the data. The message and the metadata can then be communicated to the requester. Upon receiving the metadata, a data stream can begin that transfers the data from the storage location to the requester, where the data stream can omit unnecessary or redundant header information during the transfer.

Figure 1:
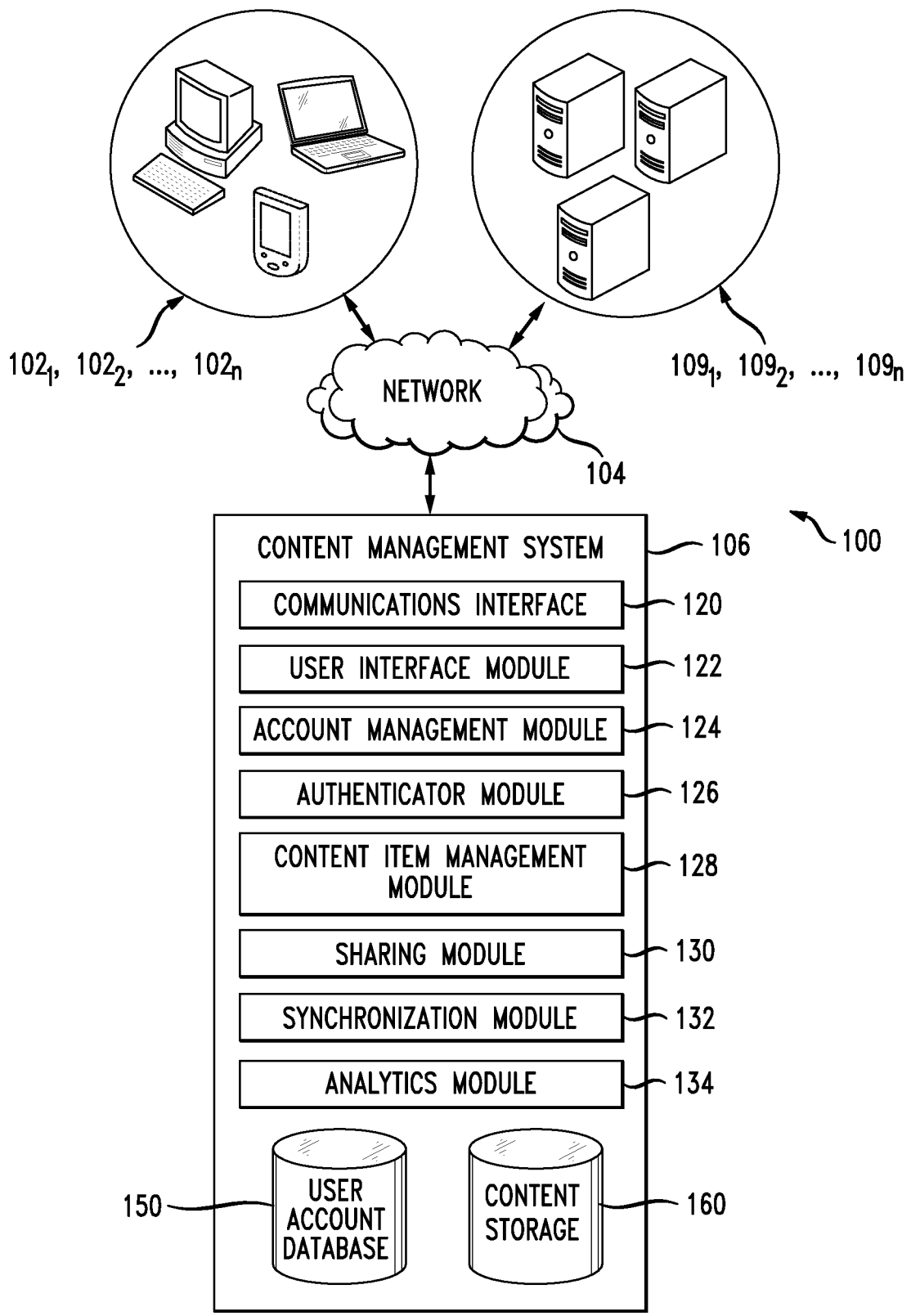
FIG. 1 shows an exemplary configuration of devices and a network in accordance with the invention.

An exemplary system configuration 100 is shown in FIG. 1, wherein electronic devices communicate via a network for purposes of exchanging content and other data. System 100 can be configured for use on a wide area network such as that shown in FIG. 1. However, the present principles are applicable to a wide variety of network configurations that facilitate the intercommunication of electronic devices, such as a local area network, wireless network, etc. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$, and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$, can upload content to content management system 106 via network 104. The content can later be retrieved from content management system 106 using the same client device $102_i$, or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of independent disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy.

Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1$, $109_2$, . . . , $109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can include a content management module 128 for maintaining a content directory. The content directory can identify the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2:
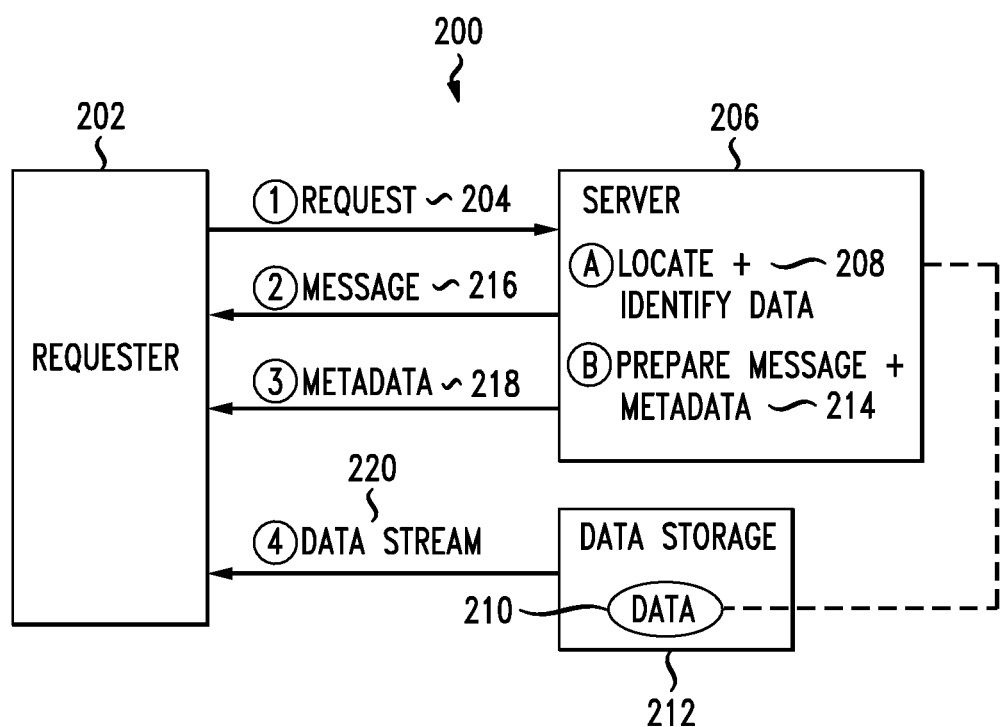
FIG. 2 shows exemplary system interactions.

Having disclosed some system, the disclosure now turns to FIG. 2, which shows exemplary system interactions 200. Requester 202 can send request 204, via a network, to server 206, such as content management system 106 shown in FIG. 1. Request 204 can specify that requester 202 desires certain data 210 stored at and/or controlled by server 206. In most configurations, this request can be made in the form of a file name. For example, the requester can request that the file "Jamaca.jpg" be transferred from the server (or a storage space under the server's control) to the requester's device. The request also can identify the file in some other way, such as by providing a unique file identifier, a path and a file name, a data block stored at an online storage provider, and so forth.

Server 206 can then locate and identify data 210 (step 208). For example, as shown data 210 is located in data storage space 212 that is separate from server 206. In other configurations, data 210 can be located within server 206, or the address can be a non-specific address, such as with cloud computing. When server 206 identifies data 210, server 206 can also identify the size of data 210. When the size of the file or files is below a threshold value, server 206 can initiate a transfer of data 210 to the requester using standard file transfer protocols. The requested data can be a single file, a collection of files, a storage block that can contain many files, a compressed or uncompressed archive of files, a subcomponent of a file, or any other data storage unit.

However, when the size of data 210 requested is above the threshold, server 206 can instead prepare a message and metadata (214). This threshold can be determined based on system bandwidth, bus capacities, requester and/or server capabilities, a time requirement, a file request type, a type of file requested, metadata describing the file requested, or any combination thereof. As an example, a system could have a threshold of 500 gigabytes, or the threshold could be met if the file transfer will have a duration of 5 minutes or more. In addition, the threshold could be both the 500 gigabytes and the 5 minute time cap. In one variation, the system can service all requests for files in this manner regardless of a threshold.

A second threshold can also exist, the second threshold being a "sub-threshold" to the first threshold. This second threshold can apply to files or partitions within the requested data. For example, consider where data is requested amounting to 1.2 terabytes of information, with 2 files each having a size of 600 gigabytes. The first threshold might be 2 terabytes and not be exceeded. However, a second "sub-threshold" might be exceeded, where the second threshold places a 500 gigabyte cap on any single file to be transferred. As with the first threshold, the second threshold can be based on system bandwidth, bus capacities, requester and/or server capabilities, a time requirement, or combination thereof.

When the system determines that a threshold has been exceeded, server 206 can prepare the message and metadata (214). The message can be header information associated with a file transfer protocol. The metadata can indicate the location of the data. The metadata can further include the size of the data, a format of the data, as well as an indication that the data has triggered a threshold. Server 206 can then communicate message (216) and metadata (218) separately to requester 202 via a network, without transferring the actual data.

When requester 202 receives metadata 218, it can initiate the transfer of data 210 from data storage location 212 to requester 202 via direct data stream 220 over a network. Data stream 220 can omit various protocols, headers, and other consumers of bandwidth, thereby reducing bandwidth overhead. Server 206 can service requests 204 from multiple requesters by instructing multiple data storages 212 to transmit data streams 220. Server 206 can identify and select data storage 212 to service request 204 based on which data is available at the data storage 212, a current or forecasted load of data storage 212, available bandwidth between the requester 202 and data storage 212, and so forth. Data storage location 212 can be a network attached storage (NAS), an online storage provider, a storage device attached to server 206, or some other storage device or service. Server 206 can communicate and interface with multiple different types of data storage locations 212. Server 206 and data storage location 212 can communicate directly or via a network using a wired or wireless connection.

Having disclosed some basic system components and concepts, the disclosure now turns to the exemplary method embodiment shown in FIG. 3. For the sake of clarity, the method is described in terms of exemplary content management system 106 as shown in FIG. 1 configured to practice the method. The steps outlined herein are exemplary and can be implemented in any combination thereof, including combinations that exclude, add, or modify certain steps.

Content management system 106 can receive a request for data having a data size above a threshold (302). This threshold can, for example, be a terabyte. Other configurations can have thresholds not directly tied to the data size, such as a bandwidth size, a time for data transfer, a number of files within the data, or thresholds based on the location of the data, a time for retrieval, and a number of locations from which the data has to be gathered. Sub-thresholds can also exist below the threshold and be tied to specific aspects of the data. For example, a second "sub-threshold" can be present in content management system 106 that can be specific to the format of the data, or the number of files within the data, or the size of those files. The threshold can be implied as being satisfied based on the type of request or the server to which a request is directed.

Upon receiving the request (304), content management system 106 can identify the location, the size, and the format of the data. Content management system 106 can then prepare a message, the message including header information associated with a file transfer protocol (306). This file transfer protocol can be any appropriate protocol. However, whereas most standard file transfer protocols can include the data (separated into frames) directly following the initial header information, with each subsequent frame containing additional header information identifying the frame as belonging to the data, content management system 106 may not attach the data to the message.

Figure 4A:
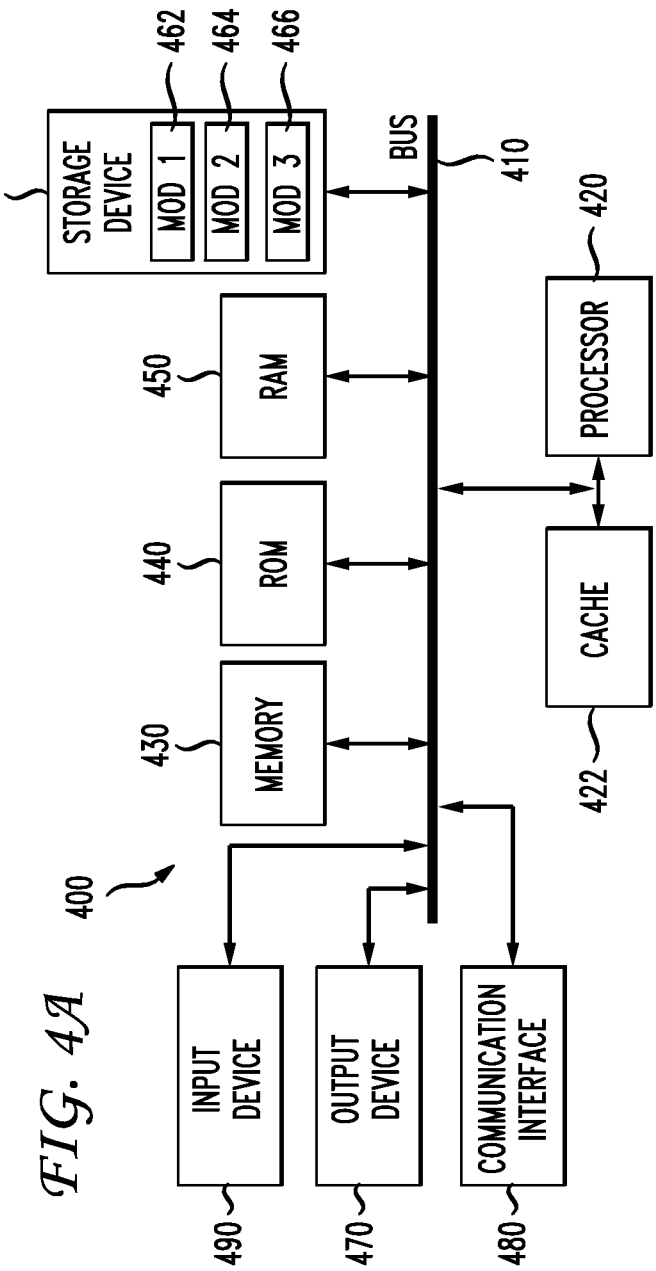
FIG. 4A shows a conventional system bus computing system architecture.
Figure 4B:
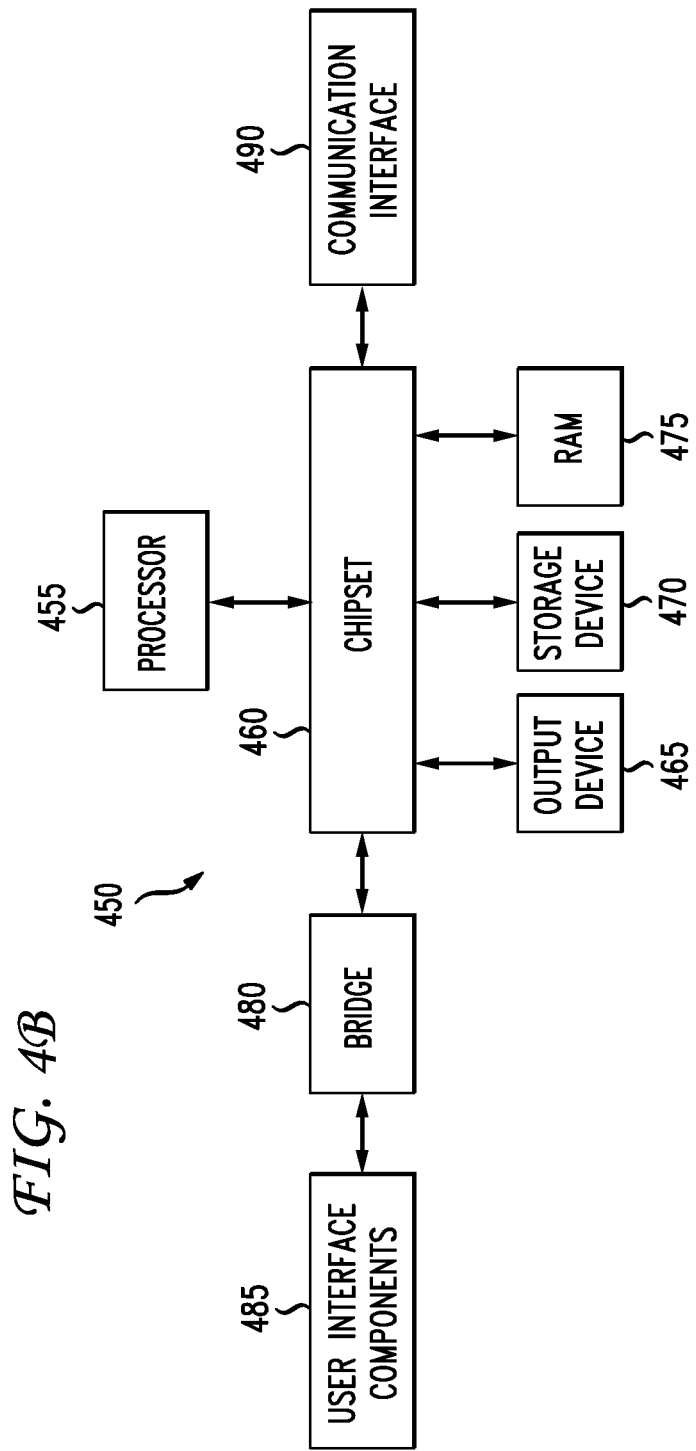
FIG. 4B shows a computer system having a chipset architecture.

Instead, content management system 106 can prepare metadata indicating the location and the size of the data (308). In other configurations, the size of the data can be removed, whereas yet other configurations may include the format of the data in the metadata. Content management system 106 can then communicate the message and the metadata to the requesting entity separately (310). Upon communicating the metadata, content management system 106 can initiate communication of the data to the requester as a data stream. This data stream may omit many of the headers and other bandwidth constricting data often used by file transfer protocols to direct network communications FIG. 4A, and FIG. 4B show exemplary possible system implementations for carrying out the present disclosure. The most appropriate embodiment will be apparent to those of ordinary skill in the art when practicing the present technology. Persons of ordinary skill in the art will also readily appreciate that other system embodiments are possible.

FIG. 4A shows a conventional system bus computing system architecture 400 wherein the components of the system are in electrical communication with each other using a bus 405. Exemplary system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware module or software module, such as module 1 432, module 2 434, and module 3 436 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, display 435, and so forth, to carry out the function.

FIG. 4B shows a computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output 465, such as a display, and can read and write information to storage device 470, which can include magnetic media, and solid state media, for example. Chipset 460 can also read data from and write data to RAM 475. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or 475. Further, the machine can receive inputs from a user via user interface components 485 and execute appropriate functions, such as browsing functions by interpreting these inputs using processor 455.

It can be appreciated that exemplary systems 400 and 450 can have more than one processor 410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A computer-implemented method comprising:
   receiving, by a processor, a request for specified data from a requester, wherein the specified data comprises multiple files;
   determining, by the processor, that the specified data has a data size above a predefined first threshold and that each file in the multiple files is above a second threshold data size;
   in response to determining that the requested specified data has a data size above the predefined first threshold:
      preparing, by the processor, a message comprising header information associated with a file transfer protocol;
      preparing, by the processor, metadata indicating at least a storage location of the requested specified data;
      communicating the message and the metadata separately to the requester without the requested specified data; and
   upon receiving the metadata by the requester, initiating transmission of the requested specified data from the storage location to the requester as a data stream, wherein the header information is omitted from the transmitted data stream.

2. The method of claim 1, wherein the first threshold comprises at least a terabyte of data.

3. The method of claim 1, wherein the requested specified data resides on shared content item management system.

4. The method of claim 1, where the second threshold data size is 100 gigabytes of data.

5. The method of claim 1, wherein the metadata further comprises a format of the data.

6. The method of claim 1, further comprising identifying at least one of the location of the data and the format of the data prior to preparing the message.

7. A non-transitory computer-readable storage medium having stored therein processor-executable instructions for causing a processor to:
   receive a request for specified data from a requester, wherein the specified data comprises multiple files;
   determine that the specified data has a data size above a predefined first threshold and that each file in the multiple files is above a second threshold data size;
   in response to the determination that the requested specified data has a data size above the predefined first threshold:
      prepare a message comprising header information associated with a file transfer protocol;
      prepare metadata indicating at least a storage location of the requested specified data;
      communicate the message and the metadata separately to the requester without the requested specified data; and
   upon the requester receiving the metadata, initiate transmission of the requested specified data from the storage location to the requester as a data stream, wherein the header information is omitted from the transmitted data stream.

8. The non-transitory computer-readable storage medium of claim 7, wherein the first threshold comprises at least a terabyte of data.

9. The non-transitory computer-readable storage medium of claim 7, wherein the requested specified data resides on shared content item management system.

10. The non-transitory computer-readable storage medium of claim 7, where the second threshold data size is 100 gigabytes of data.

11. The non-transitory computer-readable storage medium of claim 7, wherein the metadata further comprises a format of the data.

12. The non-transitory computer-readable storage medium of claim 7, the computer-readable storage medium having additional instructions stored for causing a processor to identify at least one of the location of the data and the format of the data prior to preparing the message.

13. A system comprising:
   a processor; and
   a computer-readable storage medium having stored therein processor-executable instructions for causing a processor to:
   receive a request for specified data from a requester, wherein the specified data comprises multiple files;
   determine that the specified data has a data size above a predefined first threshold and that each file in the multiple files is above a second threshold data size;
   in response to determining that the requested specified data has a data size above the predefined first threshold:
   prepare a message comprising header information associated with a file transfer protocol; and
   prepare metadata indicating at least a storage location of the requested data;
   communicate the message and the metadata separately to the requester without the requested specified data; and
   upon receiving the metadata by the requester, initiate transmission of the requested specified data from the storage location to the requester as a data stream, wherein the header information is omitted from the transmitted data stream.

14. The system of claim 13, wherein the first threshold comprises at least a terabyte of data.

15. The system of claim 13, wherein the requested specified data resides on shared content item management system.

16. The system of claim 13, where the second threshold data size is 100 gigabytes of data.

17. The system of claim 13, wherein the metadata further comprises a format of the data.

\* \* \* \* \*